United States Patent [19]

Patton

[11] 4,147,684
[45] Apr. 3, 1979

[54] PLASTICIZED COMPOSITIONS CONTAINING POLYMERS CHARACTERIZED BY 1,3-IMIDAZOLIDINE-1,3-DIYL RINGS AND N,N-DIALKYL AROMATIC SULFONAMIDES

[75] Inventor: Tad L. Patton, Baytown, Tex.

[73] Assignee: Exxon Research & Engineering Co., Florham Park, N.J.

[21] Appl. No.: 873,913

[22] Filed: Feb. 1, 1978

[51] Int. Cl.² .............................................. C08K 5/36
[52] U.S. Cl. .............................................. 260/30.8 R
[58] Field of Search .................................. 260/30.8 R

[56] References Cited

U.S. PATENT DOCUMENTS

| | | | |
|---|---|---|---|
| 2,342,370 | 2/1944 | Richter | 260/30.8 R |
| 2,855,375 | 10/1958 | Dobay | 260/30.8 R |
| 3,359,227 | 12/1967 | Amann et al. | 260/30.8 R |
| 3,495,255 | 2/1970 | George | 260/30.8 R |
| 3,533,980 | 10/1970 | Minuto | 260/30.8 R |

*Primary Examiner*—Harry Wong, Jr.
*Attorney, Agent, or Firm*—M. B. Kurtzman

[57] ABSTRACT

Normally intractable polymers of the structure:

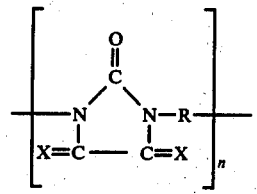

wherein X is O or NH, provided at least one X is O, such as poly (parabanic) acids are made extrudable by composition with from 10 to 60 weight percent of an N,N-dialkyl aromatic sulfonamide plasticizer.

20 Claims, No Drawings

PLASTICIZED COMPOSITIONS CONTAINING POLYMERS CHARACTERIZED BY 1,3-IMIDAZOLIDINE-1,3-DIYL RINGS AND N,N-DIALKYL AROMATIC SULFONAMIDES

BACKGROUND OF THE INVENTION

The present invention relates to the discovery of a specific class of plasticizers for poly(iminoimidazolidinediones) and poly(parabanic acid) resins.

Both the X=poly(parabanic acids) and their methods of preparation are known and described in detail in my commonly assigned U.S. Pat. No. 3,661,859, which is incorporated in its entirety herein. The poly(parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocyanates, the reaction of a dicyanoformamide or mixture of diisocyanates, or the polymerization of a cyanoformamidyl isocyanate and contain a 1,3-imidazolidinedione-1,3-diyl ring of the following structure in the repeat units:

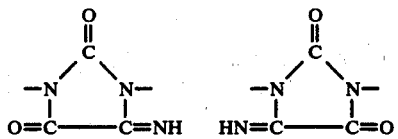

wherein NH is in the 4 or 5 position.

The poly(parabanic acids) also designated are poly(1,3-imidazolidinedione-2,4,5-triones) may be prepared, for example, by the acid hydrolysis of poly(iminoimidazolidinediones) or by the procedure in U.S. Pat. No. 3,609,113 and independent of the particular method of preparation, all contain the imidazolidinetrione ring in the repeat units:

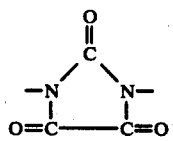

The polymers may contain both the 1,3-imidazolidinedione-1,3-diyl rings and the imidazolidinetrione ring, thus the present polymers may be broadly characterized as having the repeating unit:

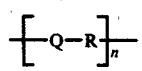

wherein Q is

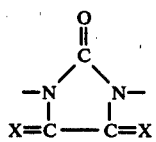

wherein X is O or NH, provided that at least one X is O, R is an organic moiety which is aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in U.S. Pat. No. 3,661,859, other patents, articles or organic textbooks as known in the art.

The present polymers have been found to have high melting points, and thus are especially suitable as magnetic tapes (where good dimensional stability at high temperatures is required) for fibers, such as tire cord fibers (where tensile strength and modulus are required) for moldings for electrical connectors, bearings, magnetic wire insulation, coatings for cables, cookware, glass fabrics, industrial belts (where high temperatures are required) and the like.

However, the present polymers decompose when they are heated at or above their glass transition temperature and as a result they can not be extruded. Previously these polymers could be processed only by solution methods or by a powder coating technique which also requires a solvent.

It is an advantage of the compositions of the present invention that the poly(iminoimidazolidinediones), poly(imidazolidine-2,4,5-tiones) or mixed poly(iminoimidazolidine-1,3/imidazolidine-2,4,5triones) or as defined above the polymers

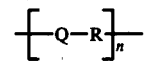

may be processed by extrusion and molding techniques, when plasticized according to the present invention.

SUMMARY OF THE INVENTION

Briefly, the present invention is a stable extrudable composition comprising heterocyclic polymers characterized in the repeating unit by the tri-substituted 1,3-imidazolidine-1,3-diyl ring:

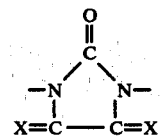

wherein X=O or NH, provided at least one X is O or more specially polymers having the repeating unit:

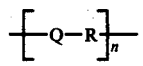

wherein Q is

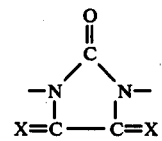

X has the significance set out above, R is an organic moiety which is aliphatic, alicyclic, aromatic or mixtures thereof and n is sufficiently large to produce a solid product and a plasticizing amount of N,N-dialkyl aromatic sulfonamide.

More particularly, the polymers may be poly(iminoimidazolidinediones) characterized by a tri-substituted 1,3-imidazolidine-1,3-diyl ring of the following structure:

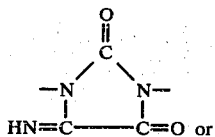

poly(parabanic acids) characterized by a tri-substituted 1,3-imidazolidine-1,3-diyl ring of the following structure:

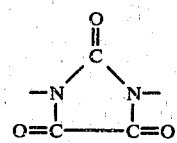

or more specifically, polymers of the general structure:

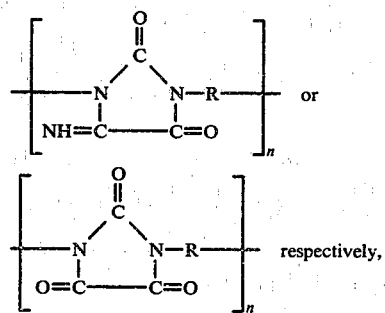

respectively, wherein R and n have the significance given above.

The plasticized compositions of the present invention are capable of being melted without decomposition.

The term "plasticizing amount" as used herein means that amount of N,N-dialkyl aromatic sulfonamide, which is compatible with the polymer to form a homogeneous composition and which will allow the polymer to melt without decomposition. Generally the plasticizer will comprise from 10 to 50 weight percent of the total of polymer and plasticizer, although the plasticizers may be used in slightly smaller amounts, i.e., 5% and in somewhat larger amounts, e.g., up to 60%.

DETAILED DESCRIPTION OF THE INVENTION

It was found that conventional plasticizers such as mixtures of N-ethyl-o-toluene sulfonamide and n-ethyl-p-toluene sulfonamide and mixtures of o-toluene sulfonamide and p-toluene sulfonamide were not useful for plasticizing the present polymers. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of N,N-dialkyl aromatic sulfonamides as plasticizers according to the present invention.

The alkyl groups of the N,N-dialkyl aromatic sulfomamide may either be the same or different and have from 1 to 8 carbon atoms in either cyclic or alicyclic configuration and the aromatic moiety may contain alkyl substituents, usually low alkyl of 1 to 5 carbon atoms, i.e., alkaryl. The aryl or alkaryl moiety may be phenyl, tolyl, xylyl, naphthyl, and the like generally having 6 to 12 carbon atoms.

Illustrative examples of the N,N-dialkyl aromatic sulfonamides of the present invention are N,N-diethyl p-toluene-sulfonamides (DETSA), N,N-dimethyl p-toluene-sulfonamide (DMTSA), N,N-di(n-butyl) p-toluene sulfonamide (DBTSA), N,N-di(cyanoethyl) p-toluene sulfonamide, N,N-dipropyl p-toluene sulfonamide, N-ethyl, N-cyanoethyl p-toluene sulfonamide, N,N-diethyl benzene sulfonamide, and N-(p-toluene sulfonyl) morpholine.

The deleterious effects of N-alkyl aromatic sulfonamides of the prior art were found to result initially in molecular weight degradation of the present polymers as demonstrated by lowered inherent viscosity and later in crosslinking to form insoluble gels. Dimethylformamide solutions of mixtures of a poly(parabanic acid) and N,N-dialkyl aromatic sulfonamides of the present invention were found to be more stable when heated than dimethylformamide solutions of the polymer alone.

The polymer-plasticizer compositions according to the present invention may be extruded without degradation. The extrusions may be carried out at temperatures in the range of 250° to 300° C. The extrudates of the invention compositions were tough, smooth, clear and amber colored.

ILLUSTRATIVE PREFERRED EMBODIMENTS

For purposes of illustration, but not for exclusion, the majority of the examples illustrating the invention will be described in specific with respect to a particular polymer. That is, a polyparabanic acid prepared from diphenyl methane diisocyanate in accordance with proprietary techniques well described in patents assigned to Exxon Research and Engineering Company to result in a high performance polymer having the repeating unit shown below:

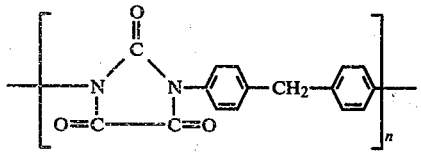

which is also designated as poly[1,4-phenylenemethylene-1,4-phenylene-1,3-(imidazolidine-2,4,5-trione)] which are also designated in chemical abstracts as poly[(2,4,5-trioxo-1,3imidazolidinediyl)-1,4-phenylene methylene-1,4-phenylene].

For purposes of convenience, this polymer species will be referred to as PPA-M. It will be recognized that other polyparabanic acids (PPA) can be produced from other precursors.

In general, the preferred polymers of the polymer-plasticizer compositions are those which have sufficient repeating units at room temperature to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

The following examples illustrate the present invention and should not be construed to limit the present invention:

EXAMPLES 1 TO 5

A solution of 25 grams of PPA-M ($\eta$inh=0.97) in 115 grams of dimethylformamide (DMF) was prepared. A weighed quantity of N,N-dimethyl p-toluene sulfonamide (DMTSA) was added to each of three 35 gram aliquotes of solution. The solutions were heated to 150° C. in an oil bath. Ten minutes were required for each solution to reach 150° C. After being heated an additional 15 minutes at 150° C., each solution was cooled in an ice water bath and diluted with 25 ml of DMF. Each polymer was precipitated from solution by pouring the solution into methanol in a Waring blender. The polymer powder was washed with methanol and then extracted with methanol in a Soxlet extractor to remove adhering DMTSA. The inherent viscosity (0.5 g polymer in 100 ml DMF at 25° C.) of each product was then determined. The results are recorded in Table I.

TABLE I

| Example | % DMTSA in Solution[a] | % DMTSA relative to PPA-M[b] | $\eta$inh |
|---|---|---|---|
| 1 | 0 | 0 | 0.70 |
| 2 | 0.93 | 5.9 | 0.75 |
| 3 | 2.00 | 10.0 | 0.78 |
| 4 | 4.4 | 19.9 | 0.76 |
| 5[c] | 2.8 | 11.2 | 0.62 |

[a]% DMTSA in solution = $\frac{\text{g. DMTSA}}{\text{wt. of solution}} \times 100$

[b]% DMTSA relative to PPA-M = $\frac{\text{wt. DMTSA}}{\text{wt. DMTSA + wt. PPA-M}} \times 100$

[c]The plasticizer was Santicizer 9, sold by Monsanto Company, a mixture of o and p-toluene sulfonamides. The procedure was substantially the same as used for DMTSA but aging was only 15 minutes.

EXAMPLES 6 TO 14

Blends of PPA-M ($\eta$inh=1.0) powder and compounds to be tested as plasticizers were made by mixing the components in a Waring blender. The dry blends were melted and mixed together in the mixing head of the Brabender Plasticorder Prep Center with a 60 ml capacity. The temperature of the mixing head was varied from 270° C. to 310° C. and the mixer rotated at 40 rpm's. The time required for the powder blend to completely melt was recorded. After mixing for 15 minutes the appearance of the molten polymer was observed. The results are summarized in Table II. The unplasticized PPA-M decomposes when heated above its glass transition temperature.

TABLE II

| Ex. | Plasticizer[a] | (%)[b] | °C.[c] | Minutes[d] to melt | Appearance[e] |
|---|---|---|---|---|---|
| 6 | MTSA | (15) | 290 | 1 | Clear, amber fluid, homogeneous |
| 7 | DETSA | (25.8) | 290 | 1 | Clear, amber fluid, homogeneous |
| 8 | DETSA | (25.8) | 270 | 1 | Clear, amber fluid, homogeneous smoke negligible |
| 9 | DETSA | (15) | 310 | 1.5 | Clear, amber fluid, homogeneous smoke negligible |
| 10 | DETSA | (15) | 290 | 3 | Clear, amber fluid, homogeneous smoke negligible |
| 11 | DBTSA | (15) | 290 | 2 | Clear, amber fluid, homogeneous smoke negligible |
| 12 | DBTSA | (15) | 270 | 2 | Clear, amber fluid, homogeneous smoke negligible |
| 13 | Santicizer 8 | (15) | 290 | 1.5 | After 9 minutes the melt became a dark powder, copious smoke evolved |
| 14 | Santicizer 9 | (15) | 290 | 1.5 | After 12 minutes the melt changed to a dark powder, copious smoke evolved |

[a]MTSA: N-(p-tolylsulfonyl) morpholine
DETSA: N,N-dimethyl p-toluene sulfonamide
DBTSA: N,N-di(n-butyl) p-toluene sulfonamide
Santicizer 8: Product of Monsanto Company, mixture of N-ethyl o and p-toluene sulfonamides
Santicizer 9: Product of Monsanto Company, mixture of o and p-toluene sulfonamides

[b]wt% = $\frac{\text{plasticizer}}{\text{plasticizer + PPA-M}} \times 100$

[c]Temperature of mixing head

[d]Minutes required for polymer blend to melt after filling the mixing head

[e]Appearance of the polymer blend after mixing 15 minutes in the mixing head

EXAMPLES 15 TO 17

Blends for extrusion were prepared by dry mixing in a Waring blender 200 grams of PPA-M ($\eta$inh=1.0) with 50 grams of the material to be evaluated as a plasticizer.

Each blend was extruded through a Brabender extruder on the Plasticorder Prep Center. The stainless steel barrel was $\frac{3}{4}$ in diameter with an L/D ratio of 20:1 and was fitted with a heated $\frac{1}{8}$ inch rod die. The barrel was heated in two zones. The screw had 10 flights feed, 5 flights compression and 5 flights metering. The compression ratio was 3:1. For all of the extrusions the extruder temperature zones were as follows: zone 1 (feed), 300° C.; zone 2, 280° C. and zone 3 (die), 280° C. The screw turned at 25 rpm's.

The appearance and intrinsic viscosities of the cooled extrudates are reported in Table III. All of the extrudates were tough in that they could be bent 180° several times before they broke.

TABLE III

| Ex. | Plasticizer[a] | (%)[b] | Extrudate Condition | Intrinsic[c] Viscosity |
|---|---|---|---|---|
| 15 | DETSA | (20) | clear, smooth | 1.09 |
| 16 | DBTSA | (20) | clear, smooth | 1.16 |

TABLE III-continued

| Ex. | Plasticizer[a] | (%)[b] | Extrudate Condition | Intrinsic[c] Viscosity |
|---|---|---|---|---|
| 17 | MTSA | (20) | clear, smooth | 1.18 |

[a]DETSA: N,N-diethyl p-toluene and sulfonamide
DBTSA: N,N-di(n-butyl) p-toluene sulfonamide
MTSA: N-(p-toluene sulfonyl) morpholine

[b]wt% = $\frac{\text{plasticizer}}{\text{plasticizer + PPA-M}} \times 100$

[c]The intrinsic viscosities of the extrudates were calculated from gel permeation chromatography data and were found to be only slightly higher than that of the polymer (1.05) which was used in these experiments.

EXAMPLES 18 AND 19

These examples compare N,N-diethyl p-toluene sulfonamide and N,N-diethyl benzene sulfonamide as plasticizers for PPA-M.

| Example | ArSo$_2$N(C$_2$H$_5$)$_2$ | wt. %[a] | Melted at 290° C.[b] |
|---|---|---|---|
| 18 | Ar = p-toluene | 15 | yes |
|  | Ar = p-toluene | 10 | no |
| 19 | Ar = phenyl | 10 | yes |
|  | Ar = 0 phenyl | 5 | no |

[a]weight per cent plasticizer in the blend of PPA-M and plasticizer.
[b]The blends were mixed in a Brabender mixing head at 290° C. under identical conditions. Those blends which melted did so after heating 1 to 1½ minutes. Those blends which did not melt were still powders after heating 15 minutes.

EXAMPLES 20 AND 21

In these examples, blends which were 15 weight percent plasticizer and 85 weight percent PPA-M were extruded through the same extruder used in examples 15–17. The temperatures of the extruder zones were zone 1 (feed): 300° C., zone 2, 280° C., zone 3 (die); 280° C. The screw speed was 20 rpm's. Both blends gave smooth, clear and tough extrudates under these conditions. Polymer was separated from a portion of each extrudate by first dissolving the cut-up extrudates in N-methyl pyrrolidone and precipitating the polymer in a large excess of methanol. The plasticizers remained in solution. The dried PPA-M powders were submitted to GPC (gel permeation chromatography). The data (Table IV) shows that the molecular weight distributions of the polymers from the extrudates were a little broader than that of the original PPA-M used in the blends. A comparison of the intrinsic viscosities (calculated from the GPC data) of the polymers from the extrudates were also less than that of the PPA-M used in the blends; however the degree of degradation was very small.

TABLE IV

| Example | Plasticizer[a] | M̄w/M̄n[b] | [η][c] |
|---|---|---|---|
| 20 | DETSA | 3.54 | 1.01 |
| 21 | DEBSA | 3.35 | 0.97 |
| original | PPA-M | 2.67 | 1.11 |

[a]DETSA = N,N-diethyl p-toluene sulfonamide
DEBSA = N,N-diethyl benzene sulfonamide
[b]Molecular weight distribution of polymers separated from the extrudates.
[c]Intrinsic viscosity of the polymers separated from the extrudates and calculated from GPC data

EXAMPLES 22–26

These examples demonstrate the utility of other N,N-dialkyl p-toluene sulfonamides as plasticizers from PPA-M.

| Example | Plasticizer[a] | (wt %) | melted[b] | quality of melt[c] |
|---|---|---|---|---|
| 22 | DPTSA | (15) | yes | clear, homogeneous |
| 23 | DCTSA | (20) | yes | clear, homogeneous |
| 24 | DCTSA | (10) | yes | clear, homogeneous |
| 25 | ECTSA | (15) | yes | clear, homogeneous |
| 26 | DATSA | (20) | yes | clear, homogeneous |

[a]DPTSA: N,N-dipropyl p-toluene sulfonamide
DCTSA: N,N-di(cyanoethyl) p-toluene sulfonamide
ECTSA: N-ethyl, N-cyanoethyl p-toluene sulfonamide
DATSA: N,N-dialkyl p-toluene sulfonamide
[b]Blend melted after mixing 1 to 1½ minutes in a Brabender plasticorder mixing head at 290° – 300° C.
[c]Appearance of polymer melt after mixing 15 minutes at 290° – 300° C.

EXAMPLES 27–29

These examples demonstrate that poly(parabanic acids) other than PPA-M are plasticized according to the present invention. Each blend was prepared by mixing 64 g. of the polymer with 16 g. of N,N-diethyl benzene sulfonamide so that it was 20% plasticizer. They were then mixed in the Plasticorder mixing head at 300° C. for 15 minutes. Each of the following blends melted within 2 minutes, and was a fluid clear homogeneous melt after mixing at 300° C. for 15 minutes.

| Example | R groups Q R$_n$, mole % |
|---|---|
| 27 | methylenediphenyl, 50 |
|  | 4,4'-bitolylenediyl, 50 |
| 28 | 2,4-tolyleneidyl, 20 |
|  | methylenediphenyl, 80 |
| 29 | 4,4'-oxydiphenyl, 100 |

The invention claimed is:

1. A stable extrudable composition comprising heterocyclic polymers characterized in the repeating unit by the tri-substituted 1,3-imidazolidine-1,3-diyl ring:

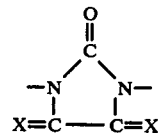

wherein X = O or NH, provided at least one X is O and a plasticizing amount of N,N-dialkyl aromatic sulfonamide.

2. A stable extrudable composition comprising heterocyclic polymers having the repeating unit:

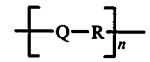

wherein Q is

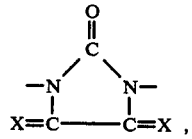

X=O or NH, provided at least one X is O, R is an organic moiety which is aliphatic, alicyclic, aromatic or mixtures thereof and n is sufficiently large to produce a solid product and a plasticizing amount of N,N-dialkyl aromatic sulfonamide.

3. The extrudable composition according to claim 2 wherein said plasticizer is present in an amount of from 5 to 60 weight percent based on the total weight of polymer and plasticizer.

4. The extrudable composition according to claim 3 wherein from 10 to 50 weight percent of plasticizer is present.

5. The extrudable composition according to claim 2 wherein the alkyl groups of the N,N-dialkyl aromatic sulfonamide having 1 to 8 carbon atoms.

6. The extrudable composition according to claim 5 wherein said aromatic moiety of the N,N-dialkyl aromatic sulfonamide is aryl or alkaryl having 6 to 12 carbon atoms.

7. The extrudable composition according to claim 6 wherein the plasticizer is N,N-diethyl p-toluene sulfonamide.

8. The extrudable composition according to claim 6 wherein the plasticizer is N,N-di(n-butyl) p-toluene sulfonamide.

9. The extrudable composition according to claim 6 wherein the plasticizer is N,N-dimethyl p-toluene sulfonamide.

10. The extrudable composition according to claim 6 wherein the plasticizer is N,N-dialkyl p-toluene sulfonamide.

11. The extrudable composition according to claim 6 wherein the plasticizer is N,N-dipropyl p-toluene sulfonamide.

12. The extrudable composition according to claim 6 wherein the plasticizer is N,N-di(cyanoethyl) p-toluene sulfonamide.

13. The extrudable composition according to claim 6 wherein the plasticizer is N-ethyl, N-cyanoethyl p-toluene sulfonamide.

14. The extrudable composition according to claim 6 wherein the plasticizer is N,N-diethyl benzene sulfonamide.

15. The extrudable composition according to claim 2 wherein the polymer has the structure:

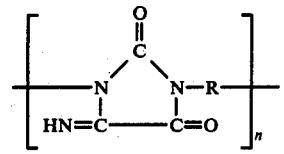

16. The extrudable composition according to claim 2 wherein the polymer has the structure:

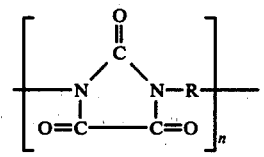

17. The extrudable composition according to claim 16 wherein the R group is methylenediphenyl.

18. The extrudable composition according to claim 16 wherein the R group is oxydiphenyl.

19. The extrudable composition according to claim 16 wherein the R group is a mixture of methylenediphenyl and 2,4-tolylenediyl groups.

20. The extrudable composition according to claim 16 wherein the R group is a mixture of methylenediphenyl and bitolylenediyl groups.

* * * * *